Dec. 8, 1936.  E. K. BROWN  2,063,787
ANTIFRICTION BEARING AND METHOD OF MAKING THE SAME
Filed Sept. 24, 1934   2 Sheets-Sheet 1
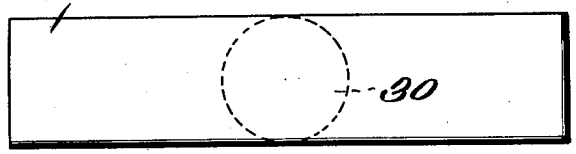
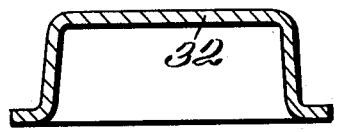
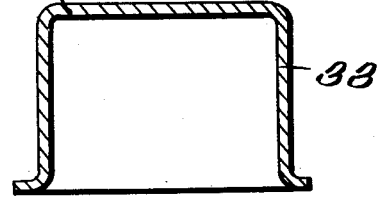
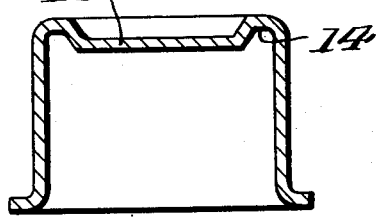
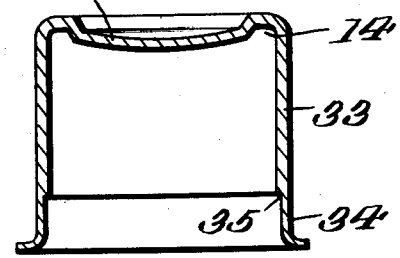
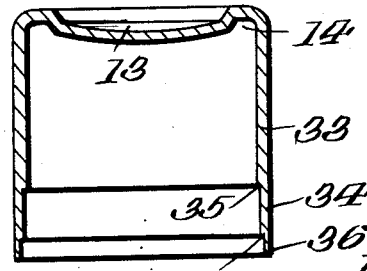
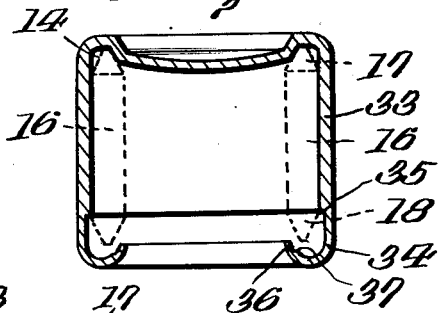
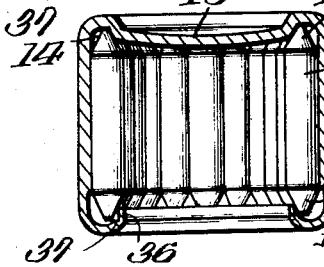
Inventor
Edmund K. Brown
By Sturtevant & Mason
Attorneys Dec. 8, 1936.  E. K. BROWN  2,063,787
ANTIFRICTION BEARING AND METHOD OF MAKING THE SAME
Filed Sept. 24, 1934  2 Sheets-Sheet 2
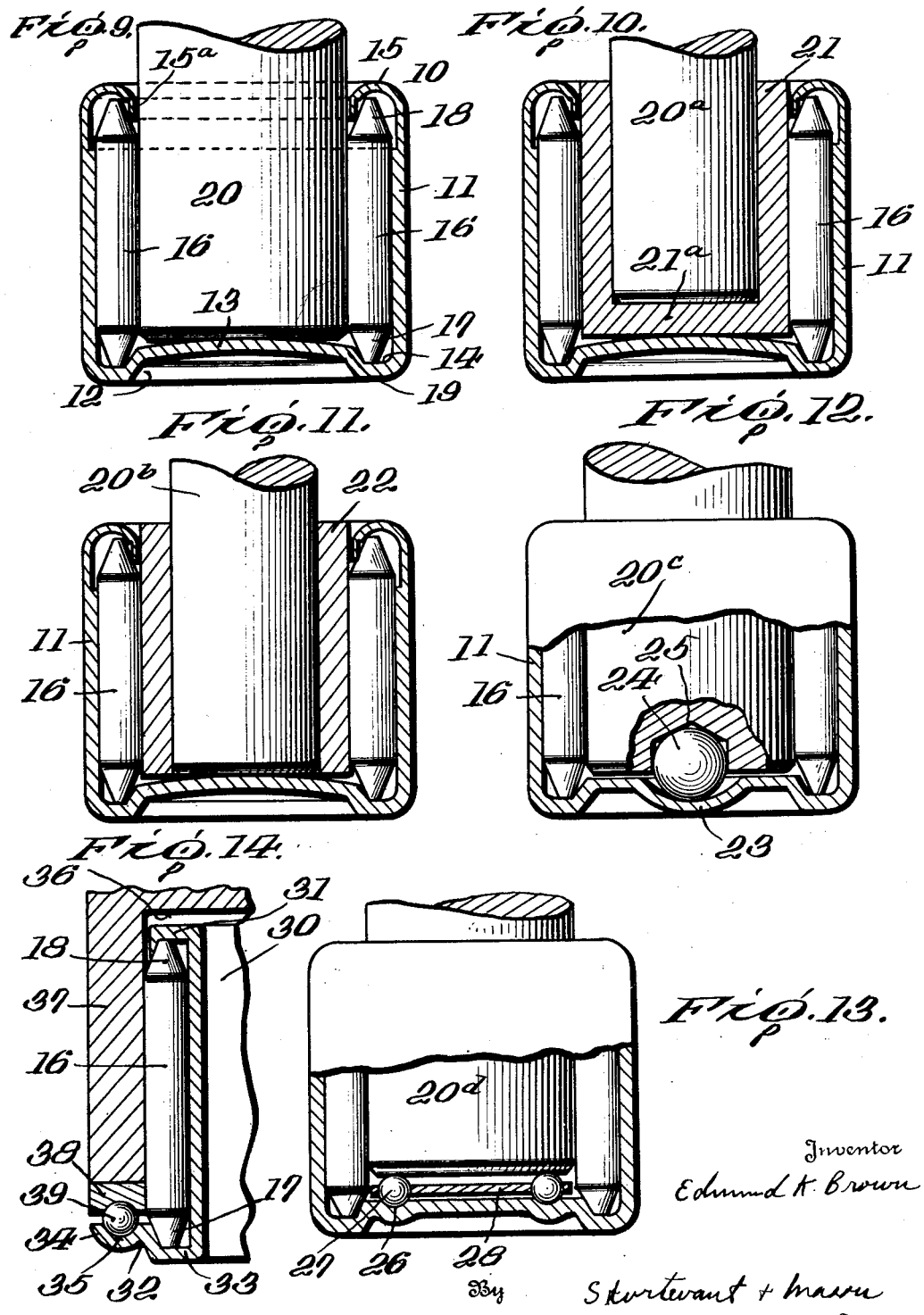

Patented Dec. 8, 1936

2,063,787

UNITED STATES PATENT OFFICE 2,063,787

ANTIFRICTION BEARING AND METHOD OF MAKING THE SAME

Edmund Karl Brown, Torrington, Conn., assignor to The Torrington Company, Torrington, Conn., a corporation of Connecticut Application September 24, 1934, Serial No. 745,361

19 Claims. (Cl. 29—148.4)

The present invention relates to new and useful improvements in antifriction bearings, and more particularly to an improved roller bushing or bearing which is adapted to be placed over the ends of shafts. The invention further relates to an improved method of making and assembling an antifriction bearing of the type referred to.

An object of the present invention is to provide an improved roller bearing assembly which may be handled as a unit and wherein a plurality of small diameter rollers having reduced end portions are held within a retaining cup member which may be placed over the end of a shaft.

A further object of the invention is to provide an improved roller bearing assembly, of the type referred to, wherein the closed end of the cup member is adapted to take up any thrust loads on the shaft.

A further object of the invention is to provide an improved roller bearing, of the type referred to, wherein the retaining cup member serves as the outer raceway and wherein the closed end of the cup member serves as a means for closing off the end of a shaft to retain a lubricant therein and to prevent the access of dust and other extraneous matter thereto.

A still further object of the invention is to provide a roller bearing assembly, of the type referred to, wherein the closed end of the retaining cup for the rollers is formed so as to retain one reduced end of each roller and wherein the open end of the retaining cup is curled inwardly to retain the opposite reduced end of each roller in order to afford a unit assembly and at the same time permitting the cylindrical body portions of the rollers to afford a direct roller contact surface for the shaft with which the bearing is used.

The invention still further aims to provide an improved method of making and forming the retaining cup and assembling the rollers therein.

The above and other objects of the invention will in part be obvious and will be hereinafter more fully pointed out.

In the accompanying drawings:

Figure 1 is a view showing a metal strip from which the retaining cup blanks are cut.

Fig. 2 is an enlarged view showing one stage in the formation of the blank.

Fig. 3 is an enlarged view showing a further stage in the formation of the blank.

Fig. 4 is a similar enlarged view showing a still further stage in the formation of the blank into cup form.

Fig. 5 is a similar enlarged view showing a further step with the free edge of the cup member reduced in thickness.

Fig. 6 is a similar enlarged view showing a still further step with the extreme edge of the cup member further reduced in thickness.

Fig. 7 is a similar enlarged view showing a further step wherein the reduced portion of the cup member is curled inwardly to a position wherein the rollers may be inserted.

Fig. 8 is an enlarged view showing the completed bearing after the reduced edge of the cup member has been forced axially to a position wherein the extreme edge is substantially parallel with the axis of the bearing and with the reduced ends of the rollers held thereby.

Fig. 9 is an enlarged view showing the completed bearing in position on a shaft.

Fig. 10 is a similar enlarged view showing the bearing in position on a shaft which has a cup pressed over the end thereof.

Fig. 11 is a similar enlarged view wherein the shaft, with which the bearing is associated, has a sleeve pressed thereon.

Fig. 12 is an enlarged view, partly in section, showing a modified form of thrust bearing associated with the retaining cup.

Fig. 13 is an enlarged view, partly in section, showing a further modified form of thrust bearing associated with the retaining cup.

Fig. 14 is a fragmentary view showing a modified form of bearing in position at the end of a heavy shaft.

The present invention consists generally in providing a roller bearing which is exceedingly well adapted for use in place of the usual bearing bushings with thrust collars which are ordinarily employed at the ends of rotating shafts. This bearing is also well adapted for use in instances where some type of closure or seal over the end of a shaft is required in order to prevent the access of dirt thereto or to retain lubricant therein. A retaining member in the form of a cup is adapted to hold a plurality of small diameter rollers in contiguous relationship. The rollers are provided with reduced end portions. The closed end of the retaining cup is formed with a groove adjacent the cylindrical wall portion thereof and one reduced end of each roller is placed therein while the open end of the cylindrical body portion of the cup member is directed inwardly to enclose and retain the opposite reduced ends of the rollers. Thus, the body portion of the rollers, that is, the cylindrical portion between the reduced ends, extends beyond the inwardly directed edge of the cup and so affords a roller contact surface for the shaft with which the bearing is to be used. The retaining cup serves not only as a holder for the rollers but also as a raceway element and a thrust bearing carrying device. The cup member is shown, in the accompanying drawings, as being an outer raceway element for purpose of illustration, in which case the shaft serves as the inner race although a sleeve or cup may be pressed on the shaft. The invention also affords a novel and inexpensive method of forming the retaining cup and of assembling and securing the rollers therein in order to provide a self-contained unit bearing assembly.

The invention will now be described in detail and reference will be made to the accompanying drawings in which Figures 9, 10, 11, 12 and 13 illustrate various forms of the complete bearing on a shaft. The cup member 10, which constitutes the outer raceway element, consists of a cylindrical body portion 11 and a closed end portion 12. The closed end portion 12 is provided with a central convex portion 13 (Fig. 9) around which is an annular trough or grooved portion 14. The free edge portion 15 of the cylindrical body portion 11 is directed inwardly with the extreme edge 15a disposed substantially parallel to the axis of the bearing and of the rollers. It is to be noted that the retaining edge 19, that is, where the convex portion 13 merges into the wall of the trough 14, and the extreme edge 15a of the portion 15 present therearound continuous and uninterrupted surfaces or edges. Each roller is provided with a cylindrical body portion 16 and with reduced end portions 17, 18. These rollers are of extremely small diameter although the relative length and diameter thereof will depend upon the particular use to which the bearing is to be put. The reduced ends 17, 18 of the rollers are illustrated as being of the chamfered type but it is to be clearly understood that they may be of any type which affords a reduced end portion for the purposes to be pointed out hereinafter. The rollers 16 are fitted within the cup in contiguous relation with the reduced ends 17 within the trough 14 in the closed end 12 of the cup and with the reduced ends 18 within the flanged portion formed by the inwardly directed free edge portion 15 of the cup 10. The reduced ends 17 of the rollers are free to contact with the inner surface of the trough 14 and with the edge 19 and the reduced ends 18 of the rollers are free to contact with the edge portion 15 and the extreme edge 15a thereof so as to provide a self-contained bearing unit. The reduced ends of the rollers are not in direct contact with the edges 19 and 15a but are free to contact therewith to prevent removal of the rollers. It will be noted that the retaining cup 10 effectually holds the rollers 16 by engagement with the reduced end portions 17, 18 thereof and that the cylindrical body portion 16 of each roller extends beyond the edge 15a of the portion 15 and also beyond the point 19 at which the convex portion 13 merges into the wall of the trough 14 so that a roller contact surface is provided for the shaft 20. In other words, the diameter of a circular line contacting with the innermost portions of the rollers is less than the diameter of the edge 15a of the flange 15 and less than the diameter of the edge 19 at the closed end of the shell. It will also be noted that the convex portion 13 of the closed end 12 of the retaining cup bears against the end of the shaft and thus affords a thrust bearing to assume any thrust load on the shaft 20.

In Fig. 10, a shaft 20a is shown with a cup member 21 pressed thereon. The bearing assembly is the same as described in connection with Fig. 9, but in this modification, the cylindrical portions 16 of the rollers contact with the cup member 21. In Fig. 11, a sleeve 22 is pressed on the shaft 20b and the rollers 16 contact with this sleeve. In each of the above modifications, the convex portion 13 of the closed end of the retaining cup 10 serves as a means for taking up any thrust loads on the shaft although the cup member 21, in Fig. 10, may be provided with suitable thrust surfaces to cooperate with the closed end of the bearing or with some intermediate thrust bearing. A sleeve or cup member on the shaft is particularly advantageous with relatively soft shafts.

In Figs. 12 and 13, the same form of bearing is employed, but different means are provided for assuming thrust loads. In Fig. 12, the closed end of the retaining cup 10 is provided with a central depressed portion 23 which is adapted to accommodate a ball 24 which partially fits within a recess 25 in the end of the shaft 20c and the thrust loads are taken up in this manner. In Fig. 13, the closed end 12 of the retaining cup is provided with an annular groove 26 within which fit the balls 27 of a ball thrust washer 28, so that thrust loads on the shaft 20d are taken up through the ball washer and the closed end of the retaining cup.

As to the method of forming the retaining cup and of assembling the rollers therein, reference will be made to Figs. 1, 2, 3, 4, 5, 6, 7 and 8 of the accompanying drawings. A blank 30 is stamped or cut from a metal strip 31 and is then operated upon by a drawing or forming process which gradually forms the blank into a cylindrical cup-shaped member 32 (Fig. 2) and then into an elongated cup-shaped member 33 (Fig. 3). The cup-shaped member 33 is then put through a forming or succession of forming operations in order to form an annular trough or depression 14 in the closed end 12 of the cup member and a central raised portion 13a which is preferably made convex, as shown at 13 in Fig. 5. It is to be understood that the shape of the surface 13 may be varied and that these forming steps may be performed at any convenient stage in the final formation of the retaining cup. As described in connection with Figs. 9–13, of the accompanying drawings, the closed end 12 of the cup member may be formed in various ways depending upon what type of thrust bearing is to be employed. The open end of the cup member 33 is drawn so as to leave a portion 34 of reduced thickness from the shoulder 35. The extreme edge of this reduced portion 34 is then further drawn so as to leave a portion 26 of further reduced thickness from a shoulder 37. These two steps are clearly shown in Figs. 5 and 6 of the drawings. The edge portion 34 of the cup member is then bent inwardly with the portion 36 directed toward the closed end 12 of the cup member, as shown in Fig. 7 of the drawings. There is a tendency for the metal of the end portions 35 and 36 to crowd and buckle when bent inwardly and this is one important reason why the end is reduced in thickness so as to obviate this tendency to buckle and thus afford a true and accurate retainer for the rollers so that they are free to roll. When the cup member has reached the stage shown in Fig. 7 before the rollers 16 have been inserted, it is subjected to a suitable hardening and polishing process. The rollers are now inserted within the retaining cup in contiguous relation with the reduced ends 17 fitting within the trough 14 in the closed end of the cup. The opposite ends 18 are adapted to slip under the edge 36 of the cup. The edge portions 34, 36 are now further curled or bent so that the extreme edge 36 is substantially parallel with the axis of the bearing and encloses the ends 18 of the rollers, as shown in Fig. 8. The cylindrical body portions of the rollers extend beyond the edge 36 so that a roller contact surface is provided within the cup member. It is of the utmost importance to have the rollers fitted within the retaining cup in such a manner that the reduced ends thereof will be free to rotate without interference by the retaining portions of the cup and it will be particularly noted that, by reducing the thickness of the curled end of the cup before the same is bent inwardly, the thickness of the shell is not increased beyond the point of safety. It will be further noted that the shoulders 35 and 37 aid in determining the proper bending point for the end portion so that the accuracy and efficiency of the bearing is materially increased. The shoulder 37 serves to properly position the edge portion 36 so that it will properly retain the rollers 16.

In Fig. 14, a further modified form is shown. In this case, the sleeve 30 is provided with a laterally extending retaining flange 31 which extends outwardly. The opposite end 32 of the sleeve extends in an outward lateral direction and is formed with a grooved or depressed portion 33 which is opposed to the retaining flange 31. Extending away from the portion 33 is a peripheral portion 34 which is provided with an annular trough 35. The rollers 16 are fitted around the outside of the sleeve 30 with the reduced ends 17, 18 thereof within and held by the grooved portion 33 and the retaining flange 31 respectively. The bearing assembly is inserted within a recess 36 in a relatively heavy shaft 37 so that the cylindrical body portions of the rollers contact therewith to assume radial loads. The annular end of the shaft may be provided with an annular insert 38 having a groove which is directly above the annular trough 35 in the peripheral portion 34. Balls 39 may be placed between the groove in the insert 38 and the trough 35 and held there in order to assume any thrust load on the shaft 37.

It will be apparent from the foregoing description that a highly efficient roller bearing and method of making the same is herewith provided. There is also provided a highly efficient roller bearing which incorporates in a single unit means for absorbing any thrust load imposed thereon. In most other roller bearings, some other provision must be made to handle any thrust loads while in the present invention, a single unitary bearing assembly is provided. This bearing is also particularly useful in that the extremely small rollers, which are very difficult to handle, are effectually held in position by the retaining cup. This bearing is well adapted for employment as a replacement for the usual bronze and brass bushings and shoulder bushings employed for thrust as well as radial loads. By its use, the extra closure devices on stub shafts are not required.

It is to be clearly understood that minor changes in details may be made without departing from the scope of the invention as set forth in the appended claims.

Having thus fully described my invention, what I claim as new and desire to secure by Letters Patent, is:—

1. In a bearing, an outer raceway element comprising a sheet metal cup member having a cylindrical body portion and a closed end portion, said closed end portion having an annular trough adjacent said body portion and said body portion having the free edge thereof directed inwardly to provide an annular retaining flange, a plurality of small diameter cylindrical rollers having reduced ends fitted around said body portion with the said reduced ends disposed within and free to contact with said annular trough and said retaining flange whereby to provide a unit bearing assembly, said closed end portion having an annular groove within said annular trough, and means including a ball thrust washer fitted in said groove for taking up thrust loads on a shaft.

2. In a bearing, an outer raceway element comprising a sheet metal cup member having a cylindrical body portion and a closed end portion, said closed end portion having a central depressed portion and having an annular trough adjacent said body portion and said body portion having the free edge thereof directed inwardly to provide an annular retaining flange, a plurality of small diameter cylindrical rollers having reduced ends fitted around said body portion with the said reduced ends disposed within and free to contact with said annular trough and said retaining flange whereby to provide a unit bearing assembly, and means including said closed end portion and a thrust bearing disposed within said central depressed portion for taking up thrust loads on a shaft.

3. In combination with a stub shaft, a bearing adapted to fit over and close the end of said shaft and including a one-piece sheet metal cup member having a cylindrical body portion and a closed end portion, said closed end portion having an annular trough adjacent said body portion and said body portion having the free edge thereof directed inwardly to provide an integral annular retaining flange directly opposed to said annular trough, and a plurality of small diameter cylindrical rollers disposed in contiguous relationship around said body portion, said rollers having reduced ends adapted to fit within and free to contact with said annular trough and said annular retaining flange whereby to provide a self-contained bearing for closing the end of said shaft.

4. In combination with a stub shaft having a sleeve pressed thereon, a bearing adapted to fit over and close the end of said shaft and including a one-piece sheet metal cup member having a cylindrical body portion and a convex closed end portion adapted to contact with said shaft to assume thrust loads, said closed end portion having an annular trough adjacent said body portion and said body portion having the free edge thereof directed inwardly to provide an integral annular retaining flange directly opposed to said annular trough, and a plurality of small cylindrical rollers disposed in contiguous relationship around said body portion, said rollers having reduced ends adapted to fit within and free to contact with said annular trough and said annular retaining flange whereby to provide a self-contained bearing for closing the end of said shaft.

5. In combination with a stub shaft having a cup member pressed over the end thereof, a bearing adapted to fit over said cup member and including a one-piece sheet metal cup member having a cylindrical body portion and a closed end portion adapted to contact with the closed end of the cup member pressed over the end of the shaft, said closed end portion having an annular trough adjacent said body portion and said body portion having the free edge thereof directed inwardly to provide an integral annular retaining flange directly opposed to said annular trough, and a plurality of small diameter cylindrical rollers disposed in contiguous relationship around said body portion, said rollers having reduced ends adapted to fit within and free to contact with said annular trough and said annular retaining flange whereby to provide a self-contained bearing for closing the end of said shaft.

6. In combination with a stub shaft, a bearing adapted to fit over and close the end of said shaft and including a sheet metal cup member having a cylindrical body portion and a closed end portion, said closed end portion having an annular trough adjacent said body portion and said body portion having the free edge thereof directed inwardly to provide an annular retaining flange, a plurality of small diameter cylindrical rollers disposed around said body portion, said rollers having reduced ends adapted to fit within and free to contact with said annular trough and said annular retaining flange whereby to provide a self-contained bearing for closing the end of said shaft, and means including the closed end of said cup member for providing a thrust bearing for said shaft.

7. In combination with a stub shaft having a central cavity in the end thereof, a bearing adapted to fit over and close the end of said shaft and including a sheet metal cup member having a cylindrical body portion and a closed end portion, said closed end portion having a central depressed portion opposed to the cavity in said shaft and having an annular trough adjacent said body portion and said body portion having the free edge thereof directed inwardly to provide an annular retaining flange, a plurality of small diameter cylindrical rollers disposed around said body portion, said rollers having reduced ends adapted to fit within and free to contact with said annular trough and said annular retaining flange whereby to provide a self-contained bearing for closing the end of said shaft, and a ball thrust bearing disposed within said cavity and said depressed portion for taking up thrust loads on said shaft.

8. The method of making a roller bearing assembly which consists in forming from a metal blank a cup-shaped shell, forming an annular trough in the closed end of said shell, reducing the thickness of the shell at the free end thereof, inserting a plurality of cylindrical rollers having reduced ends into said cup in substantially contiguous relation with one of the reduced ends of each roller disposed within said annular trough, and forcing the reduced free end of said cup-shaped shell inwardly to enclose the opposite reduced ends of said rollers with the extreme edge of said shell free to contact with the said reduced ends whereby to provide a self-contained unit bearing assembly.

9. The method of making a roller bearing assembly which consists in forming from a metal blank a cup-shaped shell, forming an annular trough in the closed end of said shell, reducing the thickness of the metal at the free edge of said shell in a plurality of successive operations, inserting a plurality of cylindrical rollers having reduced ends into said shell in substantially contiguous relation with one reduced end of each roller disposed within said annular trough, and forcing the reduced free edge of said shell inwardly to enclose and retain the opposite reduced ends of said rollers whereby to provide a self-contained unit bearing assembly.

10. The method of making a roller bearing assembly which consists in forming from a metal blank a cup-shaped shell, forming an annular trough in the closed end of said shell, reducing the thickness of the free edge of said shell in a plurality of successive operations whereby to leave well defined shoulders, forcing the reduced end of said shell inwardly, inserting a plurality of cylindrical rollers having reduced ends into said shell in substantially contiguous relation with one reduced end of each roller disposed within said annular trough and with the opposite ends of said rollers disposed under the inwardly directed reduced edge of said shell, and finally again forcing the reduced edge of said shell axially to enclose and retain the reduced ends of said rollers with the extreme edge of said reduced portion substantially parallel to the axis of said bearing.

11. The method of making a roller bearing assembly which consists in forming from a metal blank a cup-shaped shell, forming an annular trough in the closed end of said shell, reducing the thickness of the metal at the free edge of said shell in a plurality of successive operations, subjecting said shell to a suitable hardening and polishing process, inserting a plurality of cylindrical rollers having reduced ends into said shell in substantially contiguous relation with one reduced end of each roller disposed within said annular trough, and forcing the reduced free edge of said shell inwardly to enclose and retain the opposite reduced ends of said rollers whereby to provide a self-contained unit bearing assembly.

12. The method of making a roller bearing assembly which consists in forming from a metal blank a cup-shaped shell, forming an annular trough in the closed end of said shell, reducing the thickness of the free edge of said shell in a plurality of successive operations whereby to leave well defined shoulders, forcing the reduced end of said shell inwardly, subjecting said shell to a suitable hardening and polishing process, inserting a plurality of cylindrical rollers having reduced ends into said shell in substantially contiguous relation with one reduced end of each roller disposed within said annular trough and with the opposite ends of said rollers disposed under the inwardly directed reduced edge of said shell, and finally again forcing the reduced edge of said shell axially to enclose and retain the reduced ends of said rollers with the extreme edge of said reduced portion substantially parallel to the axis of said bearing.

13. The method of making a roller bearing assembly which consists in forming from a metal blank a cup-shaped shell, forming an annular trough in the closed end of said shell, forming suitably shaped thrust surfaces on said closed end within said annular trough, inserting a plurality of cylindrical rollers having reduced ends into said shell in substantially contiguous relation with one reduced end of each roller fitting within said annular trough, and curling the free edge of said shell inwardly to enclose and retain the opposite reduced ends of said rollers with the extreme edge of said shell free to contact with the said reduced ends whereby to provide a self-contained roller bearing assembly.

14. The method of making a roller bearing assembly which consists in forming from a metal blank a cup-shaped shell, forming an annular trough in the closed end of said shell, forming suitably shaped thrust surfaces on said closed end within said annular trough, reducing the thickness of the free edge of said shell in a plurality of successive operations, subjecting said shell to a suitable hardening and polishing operation, inserting a plurality of cylindrical rollers having reduced ends into said shell in substantially contiguous relation with one reduced end of each roller fitting within said annular trough, and curling the reduced edge of said shell inwardly to enclose and retain the opposite reduced ends of said rollers whereby to provide a self-contained bearing assembly.

15. The method of making a roller bearing assembly which consists in forming from a metal blank a cup-shaped shell, forming an annular trough in the closed end of said shell, forming the central portion of said closed end into a suitably shaped thrust bearing surface, reducing the thickness of the free edge of said shell, then further reducing the thickness of a lesser portion of the extreme free edge of said shell, curling the reduced portion inwardly with the extreme edge extending axially of the bearing, subjecting the shell to a suitable hardening and polishing operation, inserting a plurality of cylindrical rollers having reduced ends into said shell in substantially contiguous relation with one reduced end of each roller fitting within said annular trough and with the opposite reduced ends of said rollers disposed under the inwardly curled reduced portion, and finally forcing the reduced edge portion further axially to enclose and retain the reduced ends of said rollers whereby to provide a self-contained bearing assembly.

16. A self-contained anti-friction bearing adapted to be placed over the end of a shaft, comprising a one-piece sheet metal raceway element having a body portion and a closed end portion, said closed end portion having an inwardly facing annular retaining trough adjacent said body portion, said body portion having the free edge thereof directed inwardly to provide an integral annular retaining flange opposed to said retaining trough, and a plurality of small diameter cylindrical rollers disposed in contiguous relationship around said body portion and having reduced ends, portions of said reduced ends extending into said retaining trough and into said retaining flange and being free to contact therewith whereby to provide a self-contained unit.

17. A self-contained anti-friction bearing adapted to be placed over the end of a shaft, comprising a one-piece sheet metal raceway element having a cylindrical body portion and a closed end portion for absorbing thrust loads on the shaft, said closed end portion having an inwardly facing annular retaining trough adjacent said body portion, said body portion having the free edge thereof directed inwardly to provide an integral annular retaining flange directly opposed to said retaining trough, the free edge of said retaining flange presenting a continuous and uninterrupted edge, and a plurality of small diameter cylindrical rollers disposed in contiguous relationship around said body portion and having reduced ends, portions of said reduced ends extending into said retaining trough and into said retaining flange and being free to contact therewith whereby to provide a self-contained unit, and the diameter of a circular line contacting with the body portions of said rollers being less than the diameter of the edge of said retaining flange whereby to provide an inner roller to contact the surface.

18. A self-contained anti-friction bearing adapted to be placed over the end of a shaft, comprising a one-piece sheet metal raceway element having a cylindrical body portion and an inwardly convexed closed end portion for absorbing thrust loads on the shaft, said closed end portion having an inwardly facing annular retaining trough adjacent said body portion, said body portion having the free edge thereof directed inwardly to provide an integral annular retaining flange directly opposed to said retaining trough, the free edge of said retaining flange presenting a continuous and uninterrupted edge, and a plurality of small diameter cylindrical rollers disposed in contiguous relationship around said body portion and having reduced ends, portions of said reduced ends extending into said retaining trough and into said retaining flange and being free to contact therewith whereby to provide a self-contained unit.

19. A self-contained anti-friction bearing adapted to be placed over the end of a shaft, comprising a one-piece sheet metal raceway element having a cylindrical body portion and a closed end portion for absorbing thrust loads on the shaft, said closed end portion having an inwardly facing annular retaining trough adjacent said body portion, said body portion having the free edge thereof directed inwardly to provide an integral annular retaining flange directly opposed to said retaining trough, the free edge of said retaining flange presenting a continuous and uninterrupted edge, and a plurality of small diameter cylindrical rollers disposed in contiguous relationship around said body portion and having reduced ends, portions of said reduced ends extending into said retaining trough and into said retaining flange and being free to contact therewith whereby to provide a self-contained unit, and means including said closed end portion and a thrust bearing for assuming thrust loads on the shaft.

EDMUND KARL BROWN.